United States Patent
Wang et al.

(10) Patent No.: US 10,256,628 B2
(45) Date of Patent: Apr. 9, 2019

(54) CONTROLLER AND METHOD OF CONTROLLING POWER SUPPLIED FROM A SMALL POWER SOURCE TO A POWER GRID

(71) Applicant: COOPER TECHNOLOGIES COMPANY, Houston, TX (US)

(72) Inventors: Yigang Wang, Maple Grove, MN (US); Roger Wayne Rognli, Otsego, MN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 496 days.

(21) Appl. No.: 14/921,089

(22) Filed: Oct. 23, 2015

(65) Prior Publication Data
US 2017/0117708 A1 Apr. 27, 2017

(51) Int. Cl.
| | |
|---|---|
| H02J 3/00 | (2006.01) |
| H02J 3/14 | (2006.01) |
| B60L 11/18 | (2006.01) |
| H02J 3/38 | (2006.01) |

(52) U.S. Cl.
CPC ...... *H02J 3/00* (2013.01); *H02J 3/14* (2013.01); *B60L 11/1844* (2013.01); *H02J 3/383* (2013.01); *H02J 2003/143* (2013.01); *Y02B 70/3225* (2013.01); *Y02B 70/3266* (2013.01); *Y02E 10/563* (2013.01); *Y04S 20/222* (2013.01); *Y04S 20/224* (2013.01); *Y04S 20/242* (2013.01)

(58) Field of Classification Search
CPC ...... H02J 3/00; H02J 3/14; H02J 3/383; H02J 2003/143; B60L 11/1844; Y02B 70/3266; Y02E 10/563; Y04S 20/222; Y04S 20/224; Y04S 20/242
USPC .......................................................... 307/34
See application file for complete search history.

(56) References Cited

U.S. PATENT DOCUMENTS

| | | |
|---|---|---|
| 2006/0152010 A1 | 7/2006 | Wobben |
| 2012/0083939 A1 | 4/2012 | Rognli |
| 2013/0043724 A1 | 2/2013 | Daniels et al. |

FOREIGN PATENT DOCUMENTS

WO    2014/013010 A2    1/2014

OTHER PUBLICATIONS

European Patent Office, "extended European search report", (corresp. to EP 16194745.2), dated Feb. 8, 2017, 15 pp.

*Primary Examiner* — Carlos D Amaya
(74) *Attorney, Agent, or Firm* — Eckert Seamans

(57) ABSTRACT

A controller and method are usable to control the provision of electrical power from a local electrical network to a power grid. If it is determined that changes in the power grid voltage are correlated with the provision of power to the power grid, the power that is being provided to the power grid is manipulated so that the rate of change of the wattage that is provided to the power grid does not exceed a predetermined ramp rate. Such a manipulation is accomplished by adjusting an operational parameter of one or more electrical loads that are connected with the local electrical network.

16 Claims, 2 Drawing Sheets

CONTROLLER AND METHOD OF CONTROLLING POWER SUPPLIED FROM A SMALL POWER SOURCE TO A POWER GRID

BACKGROUND

Field

The disclosed and claimed concept relates generally to small power sources that are electrically connectable with a power grid and, more particularly, to a controller and a method for controlling the provision of power from a small power source to the power grid.

Related Art

Numerous types of power sources are known in the relevant art. Power sources can include power plants that are operated by utilities for large scale power generation and can also include smaller power sources that are energized by renewable power sources such as photovoltaic (PV) power sources, windmill power sources, and the like. Such smaller power sources typically have nowhere near the generation capability of, for instance, a fossil fuel powered generator employed by the electric utilities, but such small power sources are nevertheless meaningful on some level. The expression "small power source" and variations thereof herein is intended to refer to power sources that are not conventional electrical utilities and that are not otherwise under the control of a conventional electrical utility or other concern that controls a given power grid.

By way of example, a homeowner might own a home that includes a local electrical network that is electrically connected with a power grid, with the power grid being electrically connected with an electrical generator that is controlled by an electrical utility. The local electrical network typically will include a load center or circuit breaker panel, by way of example, that is electrically connected with the power grid and that further includes various electrical loads that are electrically connected with the load center. Such electrical loads typically include domestic lighting systems, HVAC systems, hot water heaters, and electrical plugs for the connection and operation of refrigerators, television sets, clothes dryers, and the like without limitation. If the local electrical network additionally includes a small power source, such as a photovoltaic (PV) power source by way of example, the PV power source would be connected with the load center and would provide electrical power to the load center and thus to the local electrical network when the PV array has ambient light impinging thereon in a known fashion.

Since the load center is electrically connected with both the power grid and the small power source, some or all of the power that is generated by the small power source is delivered to the load center and is consumed by the loads that are connected therewith, thereby reducing the amount of power that would be otherwise be obtained from the power grid and consumed by the local electrical network. If the small power source generates more power than is consumed or otherwise used by the loads of the local electrical network, the excess power can be transmitted into the power grid, and the homeowner will be granted an electrical credit for the power provided to the power grid. While such systems have been generally effective for their intended purposes, they have not been without limitation.

As is generally understood, a power grid desirably has a fairly stable voltage that does not undergo rapid changes. While a power grid will almost certainly experience changes in its voltage, such voltage changes occur only gradually as a function of time. While most power grids have not typically experienced significant voltage fluctuations when loads are connected therewith, some power grids have experienced undesirable voltage fluctuations when certain small power sources that are connected with the power grid periodically supply power to the power grid.

By way of example, if in a given geographic area a large number of homeowners each have PV power sources connected with their local electrical networks, a semi-cloudy day can result in rapid changes in the power that is being supplied to the power grid by the PV power sources. This is because any given cloud can simultaneously affect a large number of PV power sources. Such a cloud can cause a large number of PV power sources to produce relatively little electrical power when the cloud is between the sun and the PV power sources. However, a gust of wind can move the cloud away from the PV power sources, at which time the PV power sources might all approximately simultaneously suddenly begin to provide surplus power to the power grid.

In order for such surplus power to flow from the local electrical networks to the power grid, the voltages of the local electrical networks must be greater than that of the power grid voltage. The sudden addition of electrical power to the power grid from a large number of PV power sources at a higher voltage than that of the power grid can sometimes result in the voltage of the power grid itself correspondingly increasing, depending upon many factors including the overall health of the power grid. Likewise, if a large number of PV power sources are providing surplus power to the power grid and a large cloud suddenly reduces the amount of PV power that is being supplied to the power grid, the power grid can experience a drop in power grid voltage depending upon a number of factors, including the health of the power grid.

Some power grids therefore impose a ramp rate on small power sources that limits the rate of change at which power is permitted to be provided to the power grid. For example, the Puerto Rico Electrical Power Authority imposes a limit of 10% of installed capacity for one-minute ramps on both PV and wind-based power generation. It thus would be desirable to provide a system that enables local electrical networks with small power sources to avoid exceeding applicable ramp rates in a cost-efficient fashion.

SUMMARY

An improved controller and method are usable to control the provision of electrical power from a local electrical network to a power grid. If it is determined that changes in the power grid voltage are correlated with the provision of power to the power grid, the power that is being provided to the power grid is manipulated so that the rate of change of the wattage that is provided to the power grid does not exceed a predetermined ramp rate. Such a manipulation is accomplished by adjusting an operational parameter of one or more electrical loads that are connected with the local electrical network.

Accordingly, an aspect of the disclosed and claimed concept is to provide an improved controller and method that control the provision of electrical power from a local electrical network to a power grid by adjusting an operational parameter of at least a first load that consumes electrical power and that is electrically connected with the local electrical network.

Another aspect of the disclosed and claimed concept is to provide such an improved controller and method that adjust the operational parameters of one or more electrical loads that are in the nature of electrical appliances and the like that are already used in the household for household chores and other operations, whereby the cost to implement the advantageous improved controller and method is incurred almost exclusively in the cost of the controller and its connection with the local electrical network.

Another aspect of the disclosed and claimed concept is to provide an improved method of controlling the provision of electrical power from a local electrical network to a power grid, the local electrical network including a power source that generates power and a number of electrically connected loads that consume power. The method can be generally stated as including determining that the power that is generated by the power source and that is unused by the number of loads is of an amount whose rate of change exceeds a predetermined rate and, responsive to the determining, adjusting an operational parameter of at least a first load of the number of loads from a first state to a second state to alter the rate of change in the amount.

Another aspect of the disclosed and claimed concept is to provide an improved controller that is structured to be electrically connected with a local electrical network, the local electrical network including a power source that generates power and a number of electrically connected loads that consume power, the controller being further structured to control the provision of electrical power from the local electrical network to a power grid. The controller can be generally stated as including a processor apparatus that can be generally stated as including a processor and a memory, an input apparatus that is structured to provide input signals to the processor apparatus, and an output apparatus that is structured to receive output signals from the processor apparatus, with the memory having stored therein a number of routines which, when executed on the processor, cause the controller to perform operations that can be generally stated as including determining that the power that is generated by the power source and that is unused by the number of loads is of an amount whose rate of change exceeds a predetermined rate and, responsive to the determining, adjusting an operational parameter of at least a first load of the number of loads from a first state to a second state to alter the rate of change in the amount.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
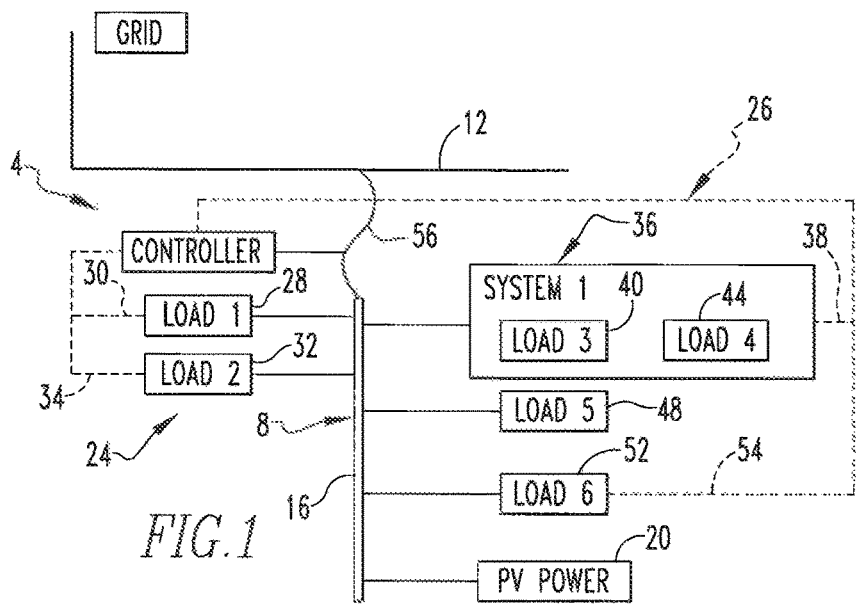
FIG. 1 is a schematic depiction of a local electrical network that is electrically connected with a power grid and that is controlled by an improved controller in accordance with the disclosed and claimed concept.
Figure 2:
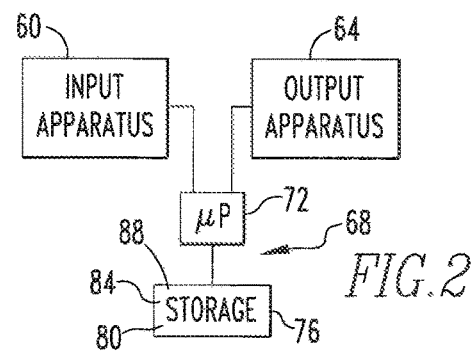
FIG. 2 is a schematic depiction of the controller of FIG. 1.

An improved controller 4 in accordance with the disclosed and claimed concept is depicted in FIGS. 1 and 2. The controller 4 is depicted in FIG. 1 in an implementation wherein a local electrical network 8 is electrically connected with a power grid 12. The controller 4 is schematically depicted in FIG. 2.

Further regarding FIG. 1, the exemplary local electrical network 8 includes a load center 16, a power source 20, and a load apparatus 24 that are electrically connected together. In the depicted exemplary embodiment, the power source 20 is a photovoltaic array. As will be set forth in greater detail below, the load apparatus 24 includes a number of electrical loads that are operable from electrical power, meaning that they consume electrical power and correspondingly perform some type of operation or work as a result of the consumption of the electrical power. As employed herein, the expression "a number of" and variations thereof shall refer broadly to any non-zero quantity, including a quantity of one. The electrical loads are, as a general matter, electrical loads that exist to perform useful work in and about the household that contains the local electrical network 8 and thus are expressly not in the nature of electrical storage batteries that are intended to store electrical power for a period of time for the purpose of eventually returning the stored electrical power to the local electrical network 8 or to the power grid 12. While it is noted that some of the electrical loads of the load apparatus 24 can include rechargeable batteries that perform useful work with the stored electrical charge, such as battery-powered hedge trimmers, electric vehicles, and the like, it is further noted that such electrical loads store electrical power for the purpose of later consuming while performing useful work and not for the purpose of later returning the stored electrical power to the local electrical network 8 or to the power grid 12.

As will be set forth in greater detail below, the local electrical network 8 includes a connection apparatus 26 that is installed between the controller 4 and the load apparatus 24 and that is usable to enable the controller 4 to control aspects of the various loads of the local electrical network 8 in a fashion that will be set forth in greater detail below. The connection apparatus 26 is depicted herein as being a series of electrical wires that are represented in FIG. 1 with dashed lines, but it is understood that in other embodiments the connections could instead be made via a wireless communications or potentially could be communicated over the electrical wires themselves that extend from the load center 16 and that are used to provide electrical power to the various loads of the load apparatus 24. Other variations will be apparent.

As can be seen in FIG. 1, the load apparatus 24 includes a first load 28 (indicated in FIG. 1 as "LOAD 1"), a second load 32 (indicated in FIG. 1 as "LOAD 2"), a third load 40 (indicated in FIG. 1 as "LOAD 3"), a fourth load 44 (indicated in FIG. 1 as "LOAD 4"), a fifth load 48 (indicated in FIG. 1 as "LOAD 5"), and sixth load 52 (indicated in FIG. 1 as "LOAD 6"). It can be seen that the local electrical network 8 includes a system 36 (indicated in FIG. 1 as "SYSTEM 1") that includes the third and fourth loads 40 and 44. In the depicted embodiment, the system 36 is an exemplary HVAC system, and the third and fourth loads 40 and 44 are an exemplary fan motor and an exemplary compressor motor, respectively.

The connection apparatus 26 includes a plurality of connections that are schematically depicted herein as extending between the controller 4 and the various loads of the load apparatus 24 and include a first connection 30 connected with the first load 28, a second connection 34 connected with the second load 32, a third connection 38 connected with the system 36, and a fourth connection 54 connected with the sixth load 52. The fifth load 48 is depicted herein as not being connected with the controller 4 and rather as being a device that is not intended to be controlled by the controller 4, such as a burglar alarm or another device whose operation the homeowner might prefer to not have altered by the controller 4. Alternatively, the connection apparatus 26 could include another connection that extends between the controller 4 and the fifth load 48, but the controller 4 potentially could be instructed to not adjust any operational parameters of the fifth load 48 under any circumstances, by way of example.

In the depicted exemplary embodiment, the connection apparatus 26 not only enables the controller 4 to adjust one or more operational parameters of any one or more of the loads of the load apparatus 24, but the connection apparatus 26 additionally provides telemetry data from each of the loads to the controller 4 so that the controller 4 is always apprised of the operational state and operational level of each of the loads. By way of example, the first load 28 might be an electric hot water heater having an ON/OFF controller that is set to a particular temperature. As will be set forth in greater detail below, the controller 4 is operable to adjust an operational parameter of many of the various loads of the load apparatus 24, and it is therefore desirable for the controller 4 to know at all times whether the state of the first load 28 is an ON condition or an OFF condition, and the set temperature potentially is also useful information for the controller 4 to possess. It is noted, however that such telemetry data is not necessary needed in order to achieve the beneficial aspects of the claimed concept.

A connection 56 is depicted in FIG. 1 as electrically extending between the local electrical network 8 and the power grid 12, and the controller 4 is depicted as being connected with the connection 56. Such an electrical connection of the controller 4 with both the local electrical network 8 and the power grid 12 is desirable since the controller 4 periodically measures the voltage of the power grid 12 and the power that is being provided from the local electrical network 8 to the power grid 12. It is understood, however, that the controller 4 in other embodiments could be otherwise connected with the local electrical network 8, such as being disposed between the main breaker of the load center 16 and the bus bars that are connected with the power source 20 and the various loads of the load apparatus 24, etc. Other variations will be apparent.

The controller 4 is depicted schematically in FIG. 2 as including an input apparatus 60, an output apparatus 64, and a processor apparatus 68. The input apparatus 60 is configured to provide input signals to the processor apparatus 68, and the output apparatus 64 is configured to receive output signals from the processor 68.

The input apparatus 60 would include, for instance, electrical leads from the instruments that measure the voltage of the power grid 12 and the power that is supplied from the local electrical network 8 to the power grid 12. The input apparatus 60 might further include the aforementioned telemetry components of the connection apparatus 26, such as the structures that would communicate to the controller 4 whether the first load 28 is in an ON condition or in an OFF condition.

The output apparatus 64 would include the other components of the connection apparatus 26 such as the portions that extend between the controller 4 and the control components of the various loads of the load apparatus 24, such as a switch that can switch the state of the first load 28 between an ON condition and an OFF condition. The output apparatus 64 can further include a visual display on the controller 4 that may provide visual output representative of various operational conditions of the controller 4, the local electrical network 8, and/or the power grid 12, The processor apparatus 68 includes a processor 72 and a storage 76 that are connected together. The processor 72 can be any of a wide variety of processors, such as microprocessors and the like, without limitation. The storage 76 can be any of a wide variety of storage devices such as memory or other storage such as RAM, ROM, EPROM, FLASH, and the like and is a non-transitory storage medium. The storage 76 can have stored therein a number of routines 80 that are in the form of instructions and the like that are executable on the processor 72 to cause the controller 4 to perform certain operations. The storage 76 also has stored therein a set of table data 84 and a set of ramp rate data 88, among other types of data.

The table data 84 includes, in tabular form or other form, data regarding the various loads of the load apparatus 24 and the amount of power that is required to alter an operational parameter of each of the loads. For instance, the table data 84 might include a notation that a certain number of watts will be consumed if the first load 28 is switched from an OFF condition to an ON condition. Similarly, the table data 84 might include an entry indicating that the third load 40 will require a certain number of watts to operate at an ON condition at a given rotational velocity, but that the power consumption by the third load 40 can be reduced by two percent if its rotational velocity is decreased by one percent from the given rotational velocity.

The ramp rate data 88 includes any ramp rates that are imposed upon the provision of electrical power from the local electrical network 8 to the power grid 12. For instance, the power grid 12 might impose a limit of ten percent of installed capacity for one minute ramps, meaning that if an installation had a capacity of twenty-four kilowatts, that the power that is provided from the local electrical network 8 to the power grid 12 could not increase or decrease by more than 2.4 kilowatts every minute.

Figure 3:
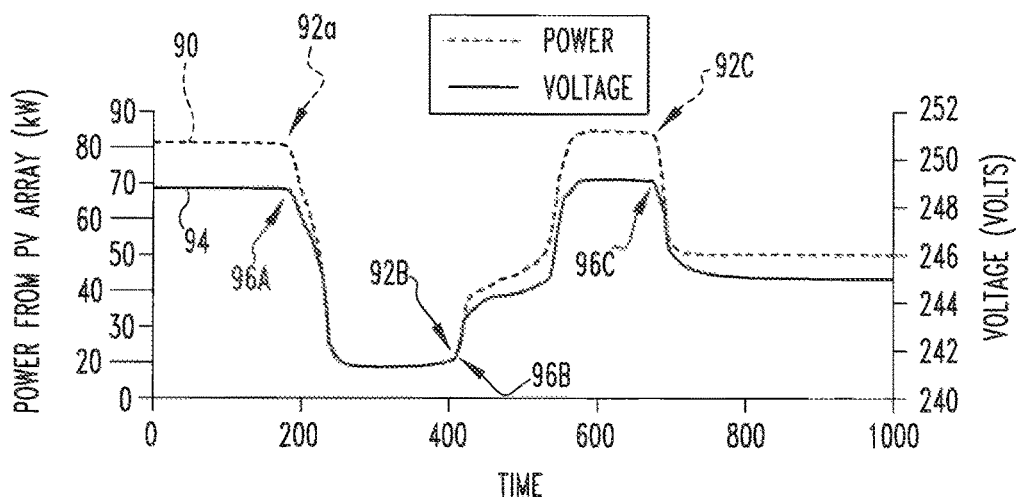
FIG. 3 is an exemplary time chart depicting the voltage of a power grid and the power provided to the power grid from a local electrical network which together indicate a need for the controller of FIG. 1 to control the rate of change of the power that is supplied to the power grid from the local electrical network.

The controller 4 and the routines 80 are aware of the ramp rate data 88, but the controller 4 in the depicted exemplary embodiment need not comply with the ramp rates that are embodied in the ramp rate data 88 unless the voltage of the power grid 12 and the power that is provided from the local electrical network 8 to the power grid 12 are sufficiently correlated. A visual example of such a sufficient correlation and a resultant need for ramp rate control is provided in FIG. 3. The exemplary FIG. 3 depicts as a function of time the voltage of the power grid 12 and the power that is being provided from the local electrical network 8 to the power grid 12. A power curve is indicated generally at the numeral 90 and includes three indicated inflection points at the numerals 92A, 92B, and 92C. The power inflection points 92A, 92B, and 92C demonstrate significant changes in the power that is being supplied to the power grid 12. A voltage curve is depicted in FIG. 3 at the numeral 94, and the voltage curve 94 likewise includes three instances where voltage inflection is indicated, i.e., at the numerals 96A, 96B, and 96C. The voltage inflection points 96A, 96B, and 96C each likewise represent significant changes in the power grid voltage.

As can be seen in FIG. 3, the power inflection point 92A and the voltage inflection point 96A occur essentially simultaneously at approximately the time 200 on the horizontal scale of FIG. 3. The power and voltage inflection points 92A and 96A represent a significant drop in power that is being provided to the power grid 12 and the voltage of the power grid 12, respectively. Similarly, the power inflection point 92B and the voltage inflection point 96B represent a substantially simultaneous increase in power and voltage, respectively, at approximately the time 410 on the horizontal scale of FIG. 3. Still similarly, the power and voltage inflection points 92C and 96C represent a substantially simultaneous decrease in power and voltage, respectively, at approximately time 690 on the horizontal axis of FIG. 3.

As mentioned above, the exemplary controller 4 complies with the applicable ramp rates only when inflections in the power curve 90 and in the voltage curve 94 are sufficiently correlated. That is, while the controller 4 has the ramp rate data 88 stored therein, the controller 4 need not adjust any operational parameters of any of the loads of the load apparatus 24 until it is determined that the power and voltage curves 90 and 94 are determined to be sufficiently correlated and the wattage of the power that is supplied from the local electrical network 8 to the power grid 12 is determined to be changing at a rate that exceeds the applicable ramp rate. As such, the controller 4 is continually measuring the voltage of the power grid 12 and the wattage of the power that is being supplied from the local electrical network 8 to the power grid 12. Such measurements may occur with a frequency that depends upon the needs of the particular application. In the example of the Puerto Rico Electric Power Authority which imposes a ramp rate of ten percent of installed capacity on one minute ramps, the voltage and power measurements potentially could be taken every second while still enabling the controller 4 to provide sufficient control within the one minute ramp window that is imposed. If shorter time windows are imposed by other ramp rates, it may be necessary to measure power and voltage at shorter intervals as appropriate.

The voltage and power values are subjected to a cross-correlation operation that is embodied in the routines 80 and that may employ the following cross-correlation function:

$$(V * P)[n] \stackrel{def}{=} \sum_{m=-1}^{50-n} V[m]P[m+n].$$

where the Voltage (V) of the power grid 12 is an array of fifty sequential normalized voltage values $m_0, m_1, \ldots m_{49}$ and Power (P) is another array of fifty sequential normalized power values $n_0, n_1, \ldots n_{49}$. Cross-correlation functions are generally well understood in the relevant art.

The result of subjecting the two arrays of fifty values each results in a series of ninety-nine correlation values, and the series of correlation values are evaluated, for example, to identify a substantial change in value, such as a substantial increase in correlated magnitude. For instance, the ninety-nine correlation values might be fed into an algorithm that is embodied in the routines 80 and that evaluates the correlation points to identify a series of, say, ten sequential correlation points whose value varies no more than ±5%, say, or other appropriate value. These ten identified points could be employed to establish a baseline with which one or more subsequent or other points in the ninety-nine point correlation array are compared. By way of example, if any subsequent point in the series of ninety-nine correlation values has a magnitude of twice the baseline, this could be established as a threshold that would identify the existence of correlation between voltage in the power grid and the power that is being supplied to the power grid 12. As mentioned above, the existence of such a correlation would be a trigger that would cause the controller to comply with applicable ramp rates that are imposed on power that is being supplied to the power grid 12.

Any of a wide variety of criteria can be applied to the series of ninety-nine correlation data points without departing from the present concept. That is, the set of correlation data points can be evaluated in accordance with whatever criteria are established for the local electrical network 8. If the series of ninety-nine correlation data points meet the pre-established criteria that are embodied in the routines 80, the routines 80 make a determination that a sufficient correlation exists between the voltage in the power grid 12 and the power that is being supplied to the power grid 12. The routines 80 will thus responsively evaluate whether the rate of change in the wattage of the power that is being supplied to the power grid 12 exceeds the applicable ramp rate that is embodied in the ramp rate data 88. If the ramp rate is being exceeded, the routines 80 will responsively cause the controller 4 to take remedial action to adjust an operational parameter of one or more of the loads in the load apparatus 24 to either decrease or increase the consumption of power by the load apparatus 24. That is, the controller 4 will act either to increase the power that is being supplied from the local electrical network 8 to the power grid 12 or to decrease the power that is being supplied from the local electrical network 8 in a fashion such that the rate of change in the wattage of the power that is being supplied to the power grid 12 does not exceed the applicable ramp rate.

As suggested above, the routines 80 will retrieve the table data 84 in order to determine a desirable strategy for adjusting the operational parameters of one or more of the loads of the load apparatus 24 to meet the applicable ramp rate. As suggested above, the first load 28 might be an electric water heater that is switchable between an ON condition and an OFF condition, and a certain wattage rate might be stored in the table data 84 as being associated with switching the first load 28 between the ON and OFF conditions.

Similarly, the second load 32 might be a set of electric lights, and it is understood that many types of electrical lights, including fluorescent, incandescent, and LED, by way of example, are operable at a plurality of different operational levels. As such, the table data 84 might include a curve or might include a table of discrete values that correlate a reduction in light intensity with a corresponding reduction in the power that is consumed by the lights. The light intensity could be adjusted by a control mechanism that is connected with the second load 32.

As was mentioned elsewhere herein, the table data 84 might include a curve and/or a set of discrete values that correlate the operational speed of the third load 40, which is an exemplary fan motor, with a corresponding change in power consumption. The table data 84 might additionally include one or more data values that represent switching the fourth load 44, which is an exemplary compressor motor of an electric heat pump, between an ON condition and an OFF condition. In this regard, it is noted that the HVAC system 36 can provide appropriate comfort to the occupants of a household or other facility for a period of time if the compressor motor 44 is de-energized, so long as the fan motor 40 remains operational. It thus is possible for a system such as the HVAC system 36 to have a plurality of loads but to, at least initially, alter an operational parameter of fewer than all of the loads that make up the system.

By way of further example, the sixth load 52 might be a pump for a filtration system on a swimming pool or may be a charger for an electric vehicle or may be any of a wide variety of other types of loads. The table data 84 would include wattage values for switching the loads between an ON condition and an OFF condition, depending upon the nature of the load, or would contain curves and/or discrete table values for changes in the operational levels of the various loads, such as operational velocity (such as in the example of a motor speed), operational intensity (such as in the example of an illumination level), and the like without limitation.

The operational parameters can be adjusted in any of a wide variety of fashions to meet the needs of the local electrical network 8 at any given time. For example, if the power source 20 is generating 1.0 kilowatts more power than can be supplied to the power grid 12 at any given instant due to the applicable ramp rate, it might be desirable to switch the first load 28 from an OFF condition to an ON condition if doing so would consume at least the 1.0 excess kilowatts. Since the applicable ramp rate that must be met is a varying, i.e., it is a ramp rate, it may be necessary to energize the first load 28 for, by way of example, only one or two minutes, after which time the first load 28 could be switched from the ON condition back to the OFF condition so long as the applicable ramp rate is not exceeded.

The ramp rates typically may include both increasing ramp rates and decreasing ramp rates. In situation where the power that is being generated by the power source 20 is decreasing rapidly in a fashion that would cause the power that is being supplied to the power grid 12 to exceed a decreasing ramp rate, it might be desirable to switch the first load 28 from an ON condition to an OFF condition. On the other hand, if the first load 28 is already in its OFF condition, it may be necessary to instead switch the fourth load 44 from its ON condition to its OFF condition if it is currently in its ON condition.

In this regard, any manner of logic can be employed to choose which of the loads of the load apparatus 24 should have their operational parameters adjusted. For example, if no individual load can have its operational parameter adjusted in a fashion that will precisely meet the applicable ramp rate, it may be desirable to switch two of the loads to increase or decrease their consumption of electricity, or to cause one of the two loads to increase its consumption of power while the other of the two loads decreases its consumption of power. Likewise, it may be desirable to rotate the loads whose operational parameter is adjusted. For instance, if the first load 28 is an electric water heater, the routines 80 might decide that it is inappropriate to constantly switch such a load to an ON condition because the frequency of energizing the hot water tank is causing its temperature level to far exceed the set water temperature. In such a case, it might be desirable to adjust the operational parameter of another load instead. Furthermore, and depending upon the length of the ramp time, it may be desirable to switch one load from an OFF condition to an ON condition while simultaneously switching another load from an ON condition to an OFF condition. Still alternatively, it may be desirable to control the HVAC system 36 by increasing or decreasing its set temperature by a certain number of degrees rather than discretely energizing or de-energizing its compressor motor 44 or by reducing the speed of its fan motor 40. Other variations will be apparent.

It thus can be seen that any of a wide variety of electrical loads that are connected with the local electrical network 8 can have an operational parameter adjusted in order to increase or decrease the power that is being supplied from the local electrical network 8 to the power grid 12. Such adjustment is performed in a fashion to meet the applicable ramp rate in circumstances where it is determined that power to the power grid 12 and voltage of the power grid 12 are correlated. By employing loads such as appliances and the like that are already existent in the household and that are electrically connected with the local electrical network 8, it is possible to avoid the excessive cost of batteries and other storage devices that are intended to temporarily store electrical power and to return such power to the local electrical network 8. Such batteries are known to be inefficient in storing electrical power, and the charge controllers that control the power that is being supplied to such batteries to charge them are likewise notoriously inefficient. The disclosed and claimed concept advantageously overcomes these shortcomings that are known to exist with such battery storage systems.

Figure 4:
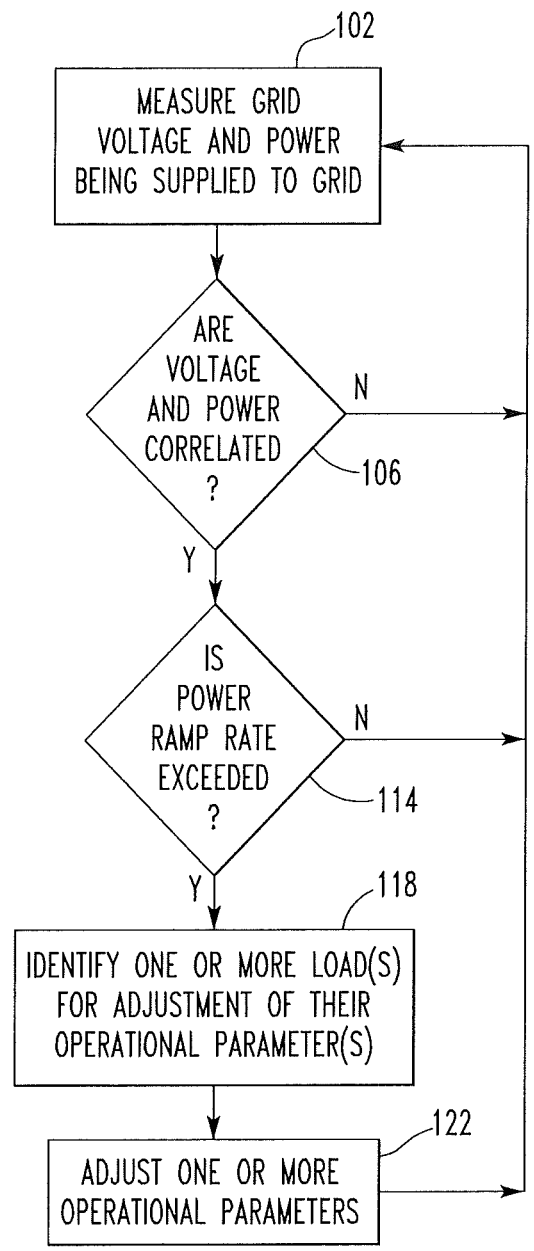
FIG. 4 is a flowchart that depicts certain exemplary aspects of an improved method in accordance with the disclosed and claimed concept.

FIG. 4 depicts a flowchart that sets forth certain aspects of an improved method in accordance with the disclosed and claimed concept. Processing begins, as at 102, where the voltage of the power grid 12 and the wattage of the power that is being supplied from the local electrical network 8 to the power grid 12 are both measured. It is then determined, as at 106, whether the power and voltage are correlated, such as by employing the cross-correlation functions set forth above. If no correlation is identified, or if any such correlation is of insufficient magnitude to meet the applicable threshold, processing returns, as at 102.

However, if such a correlation is identified at 106, processing continues, as at 114, where the routines 80 determine whether an applicable ramp rate is being exceeded. If it is determined at 114 that the ramp rate is not being exceeded, processing returns, as at 102.

However, if it is determined at 114 that the applicable ramp rate is being exceeded, processing continues, as at 118, where one or more loads of the load apparatus 24 are identified through the use of the table data 84 and the ramp rate data 88 for possible adjustment of their operational parameters. Processing then continues, as at 122, where the operational parameters of one or more of the loads of the load apparatus 24 are adjusted in a predetermined fashion to cause the power that is being supplied to the power grid 12 to no longer exceed the applicable ramp rate. Processing continues thereafter, as at 102.

The advantageous controller 4 and method set forth herein thus advantageously permit an applicable ramp rate to be met in a situation where a power grid experiences correlated changes in voltage and power supplied thereto. This advantageously helps to alleviate undesirable fluctuations in power grid voltage, which helps to safeguard loads and the power inverters that are electrically connected with the power grid 12. By controlling the operational parameters of the loads in the load apparatus 24, power delivery to the power grid 12 is smoothed in a desirable fashion while simply controlling the operational parameters of the load of the load apparatus 24 that already consume electrical power on the local electrical network 8. Other advantages will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of controlling the provision of electrical power from a local electrical network to a power grid, the local electrical network including a power source that generates power and a number of electrically connected loads that consume power, the method comprising:
   determining that the power that is generated by the power source and that is unused by the number of loads is of an amount whose rate of change exceeds a predetermined rate; and
   responsive to the determining, adjusting an operational parameter of at least a first load of the number of loads from a first state to a second state to alter the rate of change in the amount.

2. The method of claim 1, further comprising adjusting the operational parameter to alter the rate of change in the amount to be no greater than the predetermined rate.

3. The method of claim 2, further comprising, subsequent to the adjusting, returning the operational parameter from the second state toward the first state while maintaining the rate of change in the amount at no greater than the predetermined rate.

4. The method of claim 1, further comprising adjusting the operational parameter by switching a load of the number of loads between an OFF condition and an ON condition.

5. The method of claim 1 wherein the local electrical network comprises a system that comprises a plurality of loads of the number of loads, and further comprising adjusting the operational parameter by at least initially adjusting an operational parameter of each of fewer than all of the loads of the plurality of loads.

6. The method of claim 5 wherein the system is an HVAC system that includes as at least a portion of the plurality of loads a compressor motor and a fan motor, and at least initially adjusting an operational parameter of each of fewer than all of the loads of the plurality of loads by switching the compressor motor from an ON condition to an OFF condition while at least initially retaining the fan motor in an ON condition.

7. The method of claim 1, further comprising making a determination that the rate of change in the amount and a change in a voltage of the power grid are correlated and, responsive thereto, initiating the determining and the adjusting.

8. The method of claim 7, further comprising:
   performing a cross-correlation operation on a series of measurement of the voltage of the power grid and a series of measurements of the power that is generated by the power source and that is unused by the number of loads; and
   making the determination based at least in part upon a result of the cross-correlation operation.

9. The method of claim 1, further comprising adjusting the operational parameter by changing an operational velocity of a load of the number of loads.

10. The method of claim 1, further comprising adjusting the operational parameter by changing an operational level of a load of the number of loads.

11. The method of claim 10 wherein the local electrical network comprises an HVAC system that comprises a load of the number of loads, and further comprising adjusting the operational level by changing a temperature setting on the HVAC system.

12. The method of claim 1, further comprising making a determination that the amount is increasing and, responsive thereto, adjusting the operational parameter to increase power usage on the local electrical network by the number of loads.

13. The method of claim 1, further comprising making a determination that the amount is decreasing and, responsive thereto, adjusting the operational parameter to decrease power usage on the local electrical network by the number of loads.

14. The method of claim 1, further comprising identifying from a table the at least first load based at least in part upon at least one of the amount and the rate of change.

15. The method of claim 14, further comprising:
   identifying from the table an alteration to an operational level of the at least first load based at least in part upon at least one of the amount and the rate of change; and
   adjusting the operational parameter by changing the operational level of the load based at least in part upon the alteration.

16. A controller structured to be electrically connected with a local electrical network, the local electrical network including a power source that generates power and a number of electrically connected loads that consume power, the controller being further structured to control the provision of electrical power from the local electrical network to a power grid, the controller comprising:
   a processor apparatus comprising a processor and a memory;
   an input apparatus structured to provide input signals to the processor apparatus; and
   an output apparatus structured to receive output signals from the processor apparatus;
   the memory having stored therein a number of routines which, when executed on the processor, cause the controller to perform operations comprising:
   determining that the power that is generated by the power source and that is unused by the number of loads is of an amount whose rate of change exceeds a predetermined rate, and
   responsive to the determining, adjusting an operational parameter of at least a first load of the number of loads from a first state to a second state to alter the rate of change in the amount.

* * * * *